United States Patent
Jeong et al.

(10) Patent No.: US 12,040,472 B2
(45) Date of Patent: Jul. 16, 2024

(54) ELECTRODE DRYING METHOD

(71) Applicant: LG Energy Solution, Ltd., Seoul (KR)

(72) Inventors: Hee-Seok Jeong, Daejeon (KR); Myung-Ki Lee, Daejeon (KR); Joo-Yong Song, Daejeon (KR); Ji-Hee Ahn, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/592,015

(22) Filed: Feb. 3, 2022

(65) Prior Publication Data

US 2022/0158155 A1    May 19, 2022

Related U.S. Application Data

(63) Continuation of application No. 16/323,696, filed as application No. PCT/KR2017/012492 on Nov. 6, 2017, now abandoned.

(30) Foreign Application Priority Data

Dec. 21, 2016    (KR) ........................ 10-2016-0175265

(51) Int. Cl.
    *H01M 4/1391*    (2010.01)
    *H01M 4/04*    (2006.01)
    (Continued)

(52) U.S. Cl.
    CPC ........... *H01M 4/0404* (2013.01); *H01M 4/04* (2013.01); *H01M 4/0471* (2013.01);
    (Continued)

(58) Field of Classification Search
    CPC ...... H01M 4/04; H01M 4/1391; H01M 4/621; H01M 50/40; H01M 4/139; H01M 4/0471;
    (Continued)

(56) References Cited

U.S. PATENT DOCUMENTS

| | | | | |
|---|---|---|---|---|
| 2,903,497 A | * | 9/1959 | Comanor | H01M 50/409 429/247 |
| 2003/0087158 A1 | * | 5/2003 | Nakagawa | H01M 50/417 429/255 |

(Continued)

FOREIGN PATENT DOCUMENTS

| | | |
|---|---|---|
| CN | 101150182 A | 3/2008 |
| CN | 102195044 A | 9/2011 |

(Continued)

OTHER PUBLICATIONS

Search report from International Application No. PCT/KR2017/012492, mailed Feb. 13, 2018.

(Continued)

*Primary Examiner* — Pamela H Weiss
*Assistant Examiner* — Amanda Rosenbaum
(74) *Attorney, Agent, or Firm* — Lerner David LLP

(57) ABSTRACT

Disclosed herein is an electrode drying method for drying a plurality of electrodes in the state in which the electrodes are stacked, the electrode drying method including interposing a hygroscopic film between adjacent ones of the electrodes and drying the electrodes in the state in which the hygroscopic film is interposed between the electrodes, wherein at least one of the surfaces of the hygroscopic film that faces the electrodes has an uneven structure, or an electrode drying method for drying an electrode sheet in the state in which the electrode sheet is wound, the electrode drying method including winding the electrode sheet with a hygroscopic film and drying the electrode sheet in the state in which the hygroscopic film is interposed between overlapping portions of the electrode sheet, wherein at least one of the surfaces of the hygroscopic film that is disposed opposite the electrode sheet has an uneven structure.

12 Claims, 3 Drawing Sheets

(51) Int. Cl.
*H01M 4/139* (2010.01)
*H01M 4/62* (2006.01)
*H01M 4/88* (2006.01)

(52) U.S. Cl.
CPC ......... *H01M 4/139* (2013.01); *H01M 4/1391* (2013.01); *H01M 4/621* (2013.01); *H01M 4/8882* (2013.01)

(58) Field of Classification Search
CPC ........ H01M 4/23; H01M 4/20; H01M 4/8882; H01M 10/0587
See application file for complete search history.

(56) References Cited

U.S. PATENT DOCUMENTS

| | | | |
|---|---|---|---|
| 2003/0180622 A1* | 9/2003 | Tsukuda | H01M 50/44 |
| | | | 429/255 |
| 2007/0269600 A1 | 11/2007 | Gozdz et al. | |
| 2008/0187825 A1* | 8/2008 | Kawabata | H04M 15/28 |
| | | | 429/340 |
| 2011/0059343 A1* | 3/2011 | McKinney | H01M 50/429 |
| | | | 429/94 |
| 2011/0217588 A1 | 9/2011 | Roh et al. | |
| 2015/0079479 A1* | 3/2015 | Hayakawa | H01M 50/4295 |
| | | | 429/255 |
| 2016/0372732 A1* | 12/2016 | Miller | H01M 50/454 |
| 2017/0244113 A1* | 8/2017 | Kajiwara | H01M 8/0234 |
| 2018/0226700 A1 | 8/2018 | Kim et al. | |

FOREIGN PATENT DOCUMENTS

| | | | |
|---|---|---|---|
| CN | 102412388 A | | 4/2012 |
| CN | 105470450 A | | 4/2016 |
| JP | S50018174 B1 | | 6/1975 |
| JP | 2005056672 A | | 3/2005 |
| JP | 3679653 B2 | | 8/2005 |
| JP | 5398302 B2 | | 1/2014 |
| JP | 2014231407 A | | 12/2014 |
| JP | 2016103402 A | * | 6/2016 |
| JP | 2016103402 A | | 6/2016 |
| JP | 5984643 B2 | | 9/2016 |
| KR | 20120032331 A | | 4/2012 |
| KR | 20130136933 A | | 12/2013 |
| KR | 20150037332 A | | 4/2015 |
| KR | 20170059273 A | | 5/2017 |
| WO | 2016093041 A1 | | 6/2016 |

OTHER PUBLICATIONS

Search Report from Office Action for Chinese Application No. 201780043438X issued Apr. 28, 2021; 3 pages.
Search Report dated Jan. 4, 2022 from the Office Action for Chinese Application No. 201780043438.X issued Jan. 12, 2022, 2 pgs. [see p. 1, categorizing the cited references].

* cited by examiner

ELECTRODE DRYING METHOD

CROSS-REFERENCE TO RELATED APPLICATIONS

This application is a continuation of U.S. application Ser. No. 16/323,696, filed on Feb. 6, 2019, which is a national phase entry under 35 U.S.C. § 371 of International Application No. PCT/KR2017/012492, filed on Nov. 6, 2017, published in Korean, which claims priority to Korean Patent Application No. 10-2016-0175265, filed on Dec. 21, 2016, the disclosures of which are hereby incorporated herein by reference.

TECHNICAL FIELD

The present invention relates to an electrode drying method, and more particularly to an electrode drying method for drying a plurality of electrodes in the state in which a hygroscopic film is interposed between the electrodes.

BACKGROUND ART

As mobile devices have been increasingly developed and the demand for such mobile devices has increased, the demand for secondary batteries as energy sources for such mobile devices has also sharply increased. Among such secondary batteries is a lithium secondary battery having a high energy density, a high voltage, a long cycle lifespan, and a low self discharge rate, which is now commercialized and widely used.

In general, a secondary battery is manufactured by placing an electrode assembly, configured to have a structure in which a positive electrode and a negative electrode are stacked in the state in which a separator is interposed between the positive electrode and the negative electrode, in a battery case and injecting an electrolytic solution into the battery case such that the electrode assembly is impregnated with the electrolytic solution.

Each of the positive electrode and the negative electrode, i.e. each electrode, is manufactured by applying a mixture of an electrode active material, a conductive agent, and a binder to an electrode current collector and drying the mixture. As needed, a filler may be added to the mixture.

When the electrode is manufactured, as described above, a plurality of unit electrodes is dried at the same time in the state in which the unit electrodes are stacked, rather than drying the unit electrodes individually. Alternatively, an electrode sheet is dried in the state in which the electrode sheet is wound in the form of a roll.

In this case, however, each of the electrodes that are located in the middle of the electrode stack or the portion of the electrode sheet that is located at the core side of the electrode sheet wound in the form of a roll may not be sufficiently dried. As a result, the moisture content of the electrodes that are located in the middle of the electrode stack is different from the moisture content of the electrodes that are located at the outer side of the electrode stack, or the moisture content of the portion of the electrode sheet that is located at the core side of the wound electrode sheet is different from the moisture content of the portion of the electrode sheet that is located at the outer side of the wound electrode sheet. If a difference in the moisture content of the electrodes or different portions of the electrode sheet occurs when each of the electrodes or the electrode sheet is dried, secondary batteries manufactured using the electrodes or the electrode sheet dried as described above may perform differently. Particularly, in the case in which each of the electrodes that are located in the middle of the electrode stack, which may not be completely dried, or the portion of the electrode sheet that is located at the core side of the wound electrode sheet, which may not be completely dried, is used, the performance of a battery cell manufactured using the same may be greatly affected.

Furthermore, in order to completely dry each of the electrodes that are located in the middle of the electrode stack or the portion of the electrode sheet that is located at the core side of the wound electrode sheet, it is necessary to dry the electrodes or the electrode sheet in a vacuum drying furnace under a decompression condition for 10 hours or more. As a result, the drying time is lengthened. Consequently, the total electrode manufacturing time is increased, whereby manufacturing efficiency is lowered.

Alternatively, the drying temperature may be increased in order to dry the electrodes or the electrode sheet. If the drying temperature is too high, however, the electrodes or the electrode sheet may crack. In addition, the active material may be affected.

Therefore, there is an urgent necessity for technology that is capable of easily drying the electrodes that are located in the middle of the electrode stack or the portion of the electrode sheet that is located at the core side of the wound electrode sheet within a short time in order to reduce a difference in the moisture content of the electrodes or different portions of the electrode sheet.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that in the case in which a plurality of stacked electrodes is dried in the state in which a hygroscopic film having an uneven structure is interposed between the electrodes or in the case in which an electrode sheet is dried in the state in which the electrode sheet is wound with a hygroscopic film having an uneven structure, it is possible to reduce the drying time and to sufficiently dry the electrodes located in the middle of the stacked electrodes or the portion of the electrode sheet located at the core of the wound electrode sheet, whereby it is possible to achieve a desired effect. The present invention has been completed based on these findings.

Technical Solution

In accordance with one aspect of the present invention, the above and other objects can be accomplished by the provision of an electrode drying method for drying a plurality of electrodes in the state in which the plurality of electrodes are stacked, the electrode drying method including interposing a hygroscopic film between adjacent ones of the plurality of electrodes and drying the plurality of electrodes in the state in which the hygroscopic film is interposed between the adjacent ones of the plurality of electrodes, wherein at least one surface of the hygroscopic film that faces one of the adjacent ones of the plurality of electrodes has an uneven structure.

Alternatively, there is provided an electrode drying method for drying an electrode sheet in the state in which the electrode sheet is wound, the electrode drying method including winding the electrode sheet with a hygroscopic film and drying the electrode sheet in the state in which the hygroscopic film is interposed between overlapping portions of the electrode sheet, wherein at least one of the surfaces of the hygroscopic film that is disposed opposite the electrode sheet has an uneven structure.

In general, an electrode manufacturing process includes an active material application process, a press process, an inspection process, and a drying process. Specifically, at the active material application process, electrode slurry is applied to at least one surface of metal foil (as an electrode current collector), and then the electrode slurry is dried in order to remove a solvent from the electrode slurry, whereby an active material layer is formed. In the press process, the active material layer is pressed in order to improve the density of the active material layer. Subsequently, the inspection process is performed. In the inspection process, the surface of an electrode, particularly the active material layer, is inspected. Subsequently, the drying process is performed. In the drying process, the electrode is placed in a vacuum drying furnace and is then dried under a decompression condition. In the active material application process, drying is performed merely to remove the solvent from the active material layer to the extent that the subsequent process, i.e. the press process, can be performed and to the extent that active material particles are settled on the surface of the electrode current collector by a binder. In the drying process, however, the solvent is completely removed from the active material layer.

Meanwhile, in the drying process, a plurality of electrodes is not individually dried, but a plurality of stacked electrodes is dried in a vacuum drying furnace under a decompression condition, or an electrode sheet wound in the form of a roll is dried in a vacuum drying furnace under a decompression condition. At this time, it is difficult to evaporate moisture from the electrodes that are located in the middle of the stacked electrodes or from the portion of the electrode sheet that is located at the core side of the wound electrode sheet, since the electrodes are stacked or the wound electrode sheet has overlapping portions. In order to completely evaporate the moisture from the electrodes that are located in the middle of the stacked electrodes or from the portion of the electrode sheet that is located at the core side of the wound electrode sheet, therefore, a long drying time is required. If the drying time is short, a difference between the moisture content of the electrodes that are located in the middle of the electrode stack and the moisture content of the electrodes that are located at the outer side of the electrode stack, or a difference between the moisture content of the portion of the electrode sheet that is located at the core side of the wound electrode sheet and the moisture content of the portion of the electrode sheet that is located at the outer side of the wound electrode sheet, occurs, whereby the performance of cells may be reduced. In the present invention, therefore, the electrodes are dried in the state in which a hygroscopic film is interposed between the electrodes, or the electrode sheet is dried in the state in which a hygroscopic film is interposed between overlapping portions of the electrode sheet. In addition, the hygroscopic film is configured such that the surface of the hygroscopic film has an uneven structure, whereby air flow paths are entirely formed over the electrodes or the electrode sheet in order to solve the above problems.

Here, the uneven structure is not particularly restricted, as long as the uneven structure defines air flow paths, through which air can smoothly flow, between the electrodes or between the overlapping portions of the electrode sheet. Specifically, the uneven structure may be a convex structure or a concave and convex combination structure. For example, the uneven structure may be any one selected from the group consisting of: a structure having embossed curved domes, a structure having embossed polygonal domes, a round tile structure having curved valleys and curved ridges, and a polygonal tile structure having polygonal valleys and polygonal ridges. In this case, the uneven structure may be configured such that unit structures constituting the uneven structure, such as curved domes, polygonal domes, round tiles, or polygonal tiles, are regularly repeatedly arranged or randomly arranged. Specifically, the unit structures constituting the uneven structure may be regularly arranged in order to completely uniformly dry the electrodes or the electrode sheet.

In addition, in the case in which an active material is applied to opposite surfaces of each of the electrodes or to opposite surfaces of the electrode sheet, each of the opposite surfaces of the hygroscopic film that faces the electrodes or that are opposite the electrode sheet may have an uneven structure such that the opposite surfaces of each of the electrodes or the opposite surfaces of the electrode sheet are uniformly dried at similar drying speeds, for a reason similar to the above reason.

The uneven structures formed on the opposite surfaces of the hygroscopic film may be the same as each other, or may be different from each other. In consideration of convenience in manufacture, the uneven structures formed on the opposite surfaces of the hygroscopic film may be the same as each other. Specifically, the uneven structures formed on the opposite surfaces of the hygroscopic film may be complementary concave and convex combination structures or corresponding convex structures.

Here, the complementary concave and convex combination structures are configured such that when concave and convex combination structures are formed on one surface and the other surface of the hygroscopic film, a convex structure on one surface of the hygroscopic film and a concave structure on the other surface of the hygroscopic film are located so as to correspond to each other, whereby the hygroscopic film is generally formed in the shape of waves. The corresponding convex structures are configured such that when convex structures are formed on one surface and the other surface of the hygroscopic film, a convex structure on one surface of the hygroscopic film and a convex structure on the other surface of the hygroscopic film are located so as to correspond to each other, whereby the hygroscopic film is formed in an embossed shape.

In the case in which the hygroscopic film has an uneven structure, as described above, air flows to the electrodes that are located in the middle of the electrode stack or to the portion of the electrode sheet that is located at the core side of the wound electrode sheet through air flow paths defined by the uneven structure of the hygroscopic film more smoothly than in the case in which the hygroscopic film has an even structure. As a result, a difference between the air contact area of the electrodes located in the middle of the electrode stack or the portion of the electrode sheet located at the core side of the wound electrode sheet and the air contact area of the electrodes located at the outer side of the electrode stack or the portion of the electrode sheet located at the outer side of the wound electrode sheet is small, whereby it is possible to more easily dry the electrodes or the electrode sheet. Consequently, it is possible to further reduce a difference between the moisture content of the electrodes that are located in the middle of the electrode stack and the moisture content of the electrodes that are located at the outer side of the electrode stack or a difference between the moisture content of the portion of the electrode sheet that is located at the core side of the wound electrode sheet and the moisture content of the portion of the electrode sheet that is located at the outer side of the wound electrode sheet, whereby it is possible to remarkably shorten the drying time.

Meanwhile, the hygroscopic film is not particularly restricted, as long as the hygroscopic film is made of a film type material that exhibits high hygroscopicity and high resistance to winding tension. Specifically, the hygroscopic film may be a fiber film. More specifically, the hygroscopic film may be a film made of ester fiber, cellulose fiber, or alcohol fiber. Here, the alcohol fiber may be made of a polyvinyl alcohol (PVA) resin.

The polyvinyl alcohol resin exhibits high hygroscopicity. In addition, in the case in which the polyvinyl alcohol resin is wound in the form of a roll in order to dry an electrode sheet, the polyvinyl alcohol resin exhibits sufficient stretchability to withstand the tension that occurs when the polyvinyl alcohol resin is wound with the electrode sheet. Consequently, the polyvinyl alcohol resin is more preferably used.

The thickness of the hygroscopic film may be set in consideration of the hygroscopicity of the hygroscopic film or the size of the electrode stack or the roll type electrode sheet. Specifically, the thickness of the hygroscopic film may be equal to or smaller than the thickness of each of the plurality of electrodes or the electrode sheet.

If the thickness of the hygroscopic film is larger than the thickness of each of the electrodes or the electrode sheet, although it is advantageous with respect to drying of the electrodes or the electrode sheet, the volume of the hygroscopic film increases. As a result, the amount of hygroscopic film that is placed in a drying furnace having the same volume is reduced, whereby the total drying time is increased, which is undesirable. Specifically, the thickness of the hygroscopic film may be 30% to 80% of the thickness of each of the plurality of electrodes or the electrode sheet.

If the thickness of the hygroscopic film is less than 30% of the thickness of each of the electrodes or the electrode sheet, the hygroscopic film may not sufficiently absorb the moisture contained in the active material layer, which is undesirable.

Meanwhile, in order to enable the hygroscopic film to more easily absorb moisture such that the electrodes or the electrode sheet can be dried more rapidly, an adsorptive material that is capable of adsorbing moisture ($H_2O$) may be coated on at least one surface of the hygroscopic film.

The adsorptive material may be a hygroscopic material having a porous structure that is capable of adsorbing moisture. Any material that is capable of adsorbing an organic solvent as well as moisture may be more preferably used. For example, the adsorptive material may be at least one selected from the group consisting of: silica gel, alumina, and zeolite.

The adsorptive material may be coated on the hygroscopic film by dipping the film in slurry obtained by mixing ultrafine particles, such as silica gel, with a binder in an organic solvent (dip-coating) and drying the film.

In the case in which the adsorptive material is coated on the hygroscopic film, the hygroscopic film may have the above-defined thickness including the thickness of the adsorptive material coated on the hygroscopic film.

The adsorptive material may be coated on opposite surfaces of the hygroscopic film such that the hygroscopic film exhibits higher hygroscopicity and such that each of the electrodes or the electrode sheet is dried uniformly. For example, the thickness of the adsorptive material may be 10% to 50% of the thickness of the hygroscopic film.

If the thickness of the adsorptive material is less than 10% of the thickness of the hygroscopic film, the improvement of hygroscopicity based on coating of the adsorptive material is insignificant, which is undesirable. If the thickness of the adsorptive material is greater than 50% of the thickness of the hygroscopic film, the coating layer of the adsorptive material rather reduces the hygroscopicity of the hygroscopic film. Furthermore, the hygroscopic film is thickened, whereby the total volume of the hygroscopic film is increased, which is also undesirable.

In the case in which each of the electrodes or the electrode sheet is dried in accordance with the present invention, it is possible to remarkably reduce the time necessary to completely dry the electrodes that are located in the middle of the electrode stack or the portion of the electrode sheet that is located at the core side of the wound electrode sheet. In the electrode drying method according to the present invention, the drying step may be performed at a temperature of 100 to 130° C. for 60 to 300 minutes.

In the present invention, it is possible to almost uniformly dry the electrodes that are located in the middle of the electrode stack and the electrodes that are located at the outer side of the electrode stack or to almost uniformly dry the portion of the electrode sheet that is located at the core side of the wound electrode sheet and the portion of the electrode sheet that is located at the outer side of the wound electrode sheet. Even when each of the electrodes or the electrode sheet is dried as described above, the difference in moisture content is insignificant.

In accordance with another aspect of the present invention, there is provided an electrode manufactured through the electrode drying method described above.

The electrode undergoes an active material application process before a drying process, as described above.

In the case in which the electrode is a positive electrode, the positive electrode may be manufactured, for example, by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

In the case in which the electrode is a negative electrode, the negative electrode may be manufactured by applying a negative electrode material to a negative electrode current collector and drying the same. The above-described components may be selectively added to the negative electrode active material as needed.

In general, the negative electrode current collector is manufactured so as to have a thickness of 3 to 500 μm. The negative electrode current collector is not particularly restricted, so long as the negative electrode current collector exhibits high conductivity and the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0≤x≤1; 1≤y≤3; 1≤z≤8); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The electrode is used in a power storage apparatus, such as a secondary battery or an electric double layer capacitor. An example of the secondary battery is a non-aqueous electrolytic secondary battery, such as a lithium secondary battery.

The method of manufacturing the lithium secondary battery is well known in the art to which the present invention pertains.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
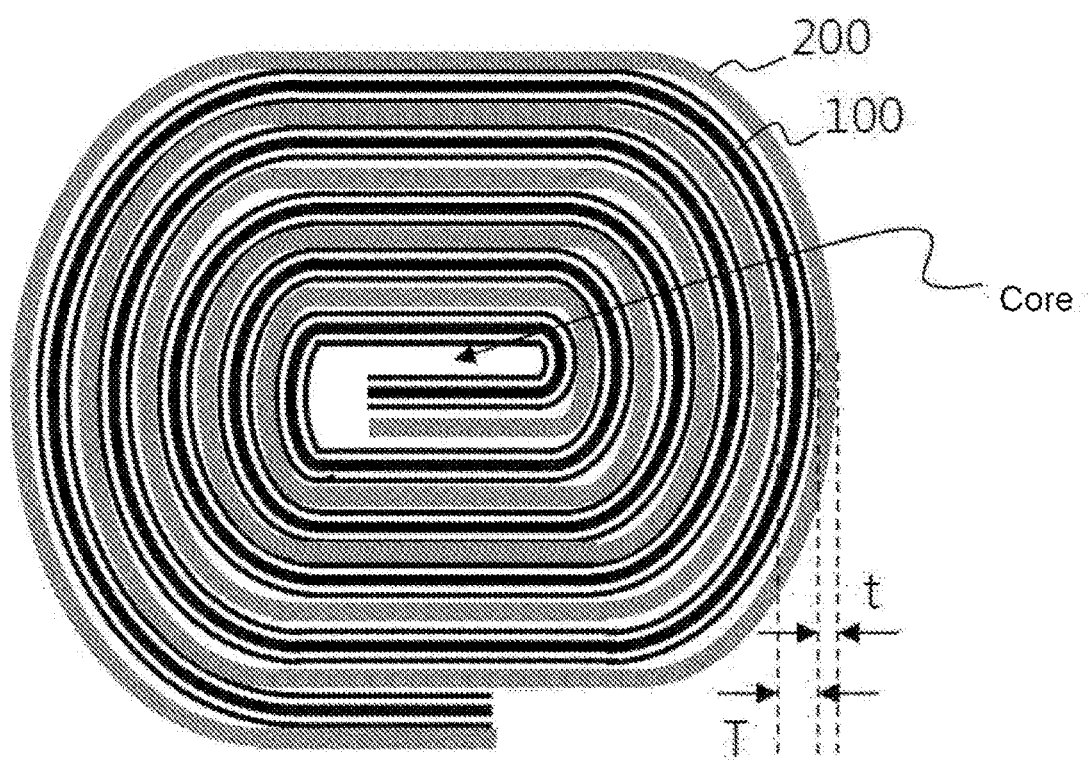
FIG. 1 is a schematic view showing an electrode sheet wound in the form of a roll in an electrode drying method according to an embodiment of the present invention.

FIG. 1 is a schematic view showing a structure in which an electrode sheet has been wound with a hygroscopic film in an electrode drying method according to an embodiment of the present invention.

Referring to FIG. 1, an electrode sheet 100 is wound with a hygroscopic film 200 in the form of a roll before the electrode sheet 100 is dried in a drying chamber. Consequently, the hygroscopic film 200 is interposed between the overlapping portions of the electrode sheet 100.

In general, an electrode sheet is dried in the state of being wound in the form of a roll in order to achieve higher drying efficiency than in the case in which a plurality of electrodes is individually dried.

In the case in which the electrode sheet is dried in the state of being wound as described above, however, the surface area of the electrode sheet that comes into contact with air gradually decreases toward the core of the wound electrode sheet 100 in the drying chamber, whereby the electrode sheet is not sufficiently dried. As a result, the moisture content of the portion of the electrode sheet that is located at the core side of the wound electrode sheet 100 is different from the moisture content of the portion of the electrode sheet that is located at the outer side of the wound electrode sheet 100. In the case in which the electrode sheet 100 dried as described above is used, batteries may perform differently. Furthermore, in the case in which an electrode sheet having a large amount of moisture contained therein is used, the performance of batteries may be greatly reduced.

In the present invention, as shown in FIG. 1, the electrode sheet 100 is wound with the hygroscopic film 200 in the state in which the hygroscopic film 200 is disposed on either the upper surface or the lower surface of the electrode sheet 100, and then the electrode sheet 100 is dried in the drying chamber. The thickness t of the hygroscopic film 200 may be smaller than the thickness T of the electrode sheet 100. For example, the thickness t of the hygroscopic film 200 may be about 70% of the thickness T of the electrode sheet 100.

In the case in which the electrode sheet 100 is wound with the hygroscopic film 200 as described above, the hygroscopic film 200 is located even at the core side of the electrode sheet 100 wound in the form of a roll. Consequently, it is possible to more easily dry the entirety of the electrode sheet 100 depending on the hygroscopic component of the hygroscopic film 200.

In addition, although not shown in detail in FIG. 1, at least one of the surfaces of the hygroscopic film 200 that are opposite the electrode sheet 100 has an uneven structure.

Here, the uneven structure may be a convex structure or a concave and convex combination structure. In particular, therefore, air flow paths are formed even at the portion of the electrode sheet 100 that is located at the core side of the wound electrode sheet 100 due to the uneven structure of the hygroscopic film 200 interposed between the overlapping portions of the electrode sheet 100. As a result, air smoothly flows through the air flow paths, whereby it is possible to more easily dry the portion of the electrode sheet 100 that is located at the core side of the wound electrode sheet 100. Consequently, it is possible to shorten the drying time and to efficiently and sufficiently dry even the portion of the electrode sheet 100 that is located at the core side of the wound electrode sheet 100. Ultimately, it is possible to reduce a difference between the moisture content of the portion of the electrode sheet that is located at the core side of the wound electrode sheet 100 and the moisture content of the portion of the electrode sheet that is located at the outer side of the wound electrode sheet 100, whereby it is possible to secure the consistency in the performance of batteries manufactured using the above electrode sheet and to prevent a reduction in the performance of the batteries.

Various examples of the uneven structure of the hygroscopic film 200 are schematically shown in FIGS. 2 to 5.

Figure 2:
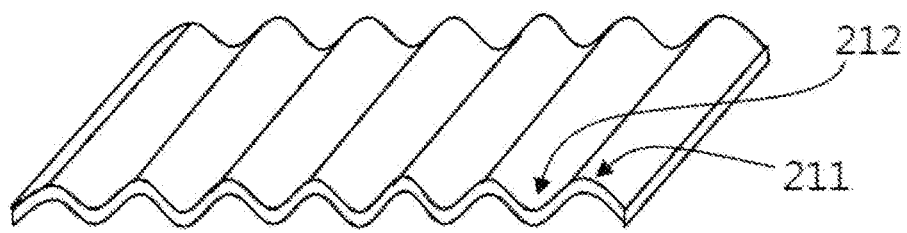
FIG. 2 is a perspective view showing an uneven structure of a hygroscopic film according to an embodiment of the present invention, which is configured to be wound with an electrode sheet.

Specifically, FIG. 2 shows an example of a hygroscopic film 210 having curved valleys 212 and curved ridges 211 alternately formed in a continuous fashion on opposite surfaces thereof. Referring to FIG. 2, the hygroscopic film 210 has a structure in which valleys 212 and ridges 211 are alternately formed in a continuous fashion on opposite surfaces thereof. The valleys 212 and ridges 211 formed on the opposite surfaces of the hygroscopic film 210 are complementary to each other, whereby the hygroscopic film 210 is generally formed in the shape of waves.

Figure 3:
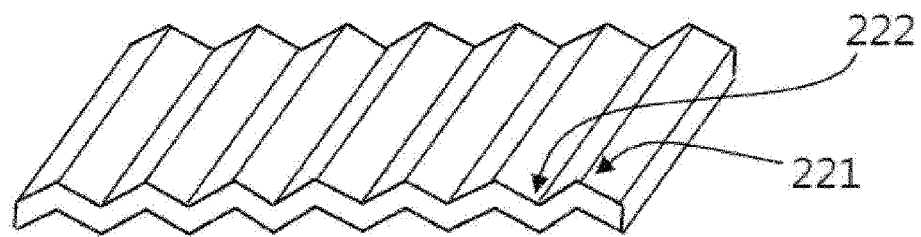
FIG. 3 is a perspective view showing an uneven structure of a hygroscopic film according to another embodiment of the present invention, which is configured to be wound with an electrode sheet.

FIG. 3 shows an example of a hygroscopic film 220 having polygonal valleys 222 and polygonal ridges 221, specifically triangular valleys 222 and triangular ridges 221, alternately formed in a continuous fashion on opposite surfaces thereof. Referring to FIG. 3, the hygroscopic film 210 has a structure in which valleys 222 and ridges 221 are alternately formed in a continuous fashion on opposite surfaces thereof such that the valleys 222 and ridges 221 are complementary to each other, similarly to what is shown in FIG. 2.

Figure 4:
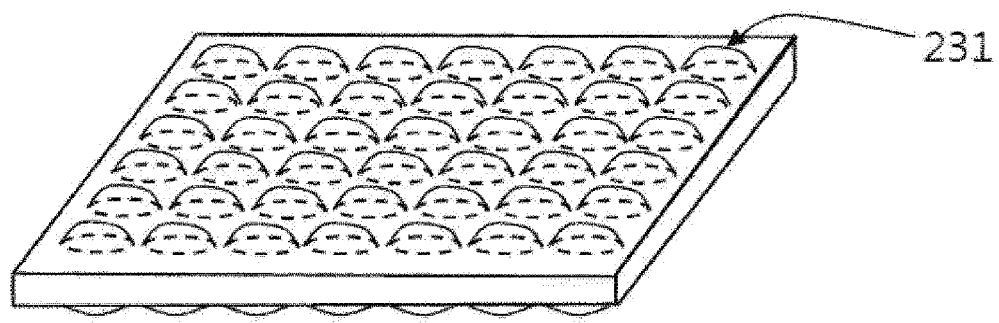
FIG. 4 is a perspective view showing an uneven structure of a hygroscopic film according to another embodiment of the present invention, which is configured to be wound with an electrode sheet.

FIG. 4 shows another example of the hygroscopic film. Specifically, FIG. 4 shows an example of an uneven structure of a hygroscopic film 230, in which a plurality of embossed curved domes 231 is formed on each surface thereof. Referring to FIG. 4, the hygroscopic film 230 has a convex structure, which is formed by the embossed curved domes 231 formed on opposite surfaces of the hygroscopic film 230. The domes 231 formed on the opposite surfaces of the hygroscopic film 230 correspond to each other, whereby the hygroscopic film 230 is formed in an embossed shape.

Figure 5:
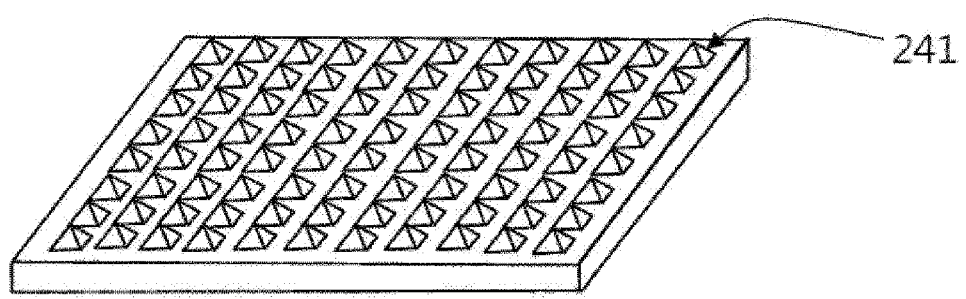
FIG. 5 is a perspective view showing an uneven structure of a hygroscopic film according to a further embodiment of the present invention, which is configured to be wound with an electrode sheet.

FIG. 5 shows an example of a hygroscopic film 240 having an uneven structure, in which embossed domes 241 are formed on the hygroscopic film, similarly to what is shown in FIG. 4, but the shape of each of the embossed domes 241 is polygonal. Referring to FIG. 5, the embossed polygonal domes 241 are formed on only one surface of the hygroscopic film 240, unlike what is shown in FIG. 4.

Figure 6:
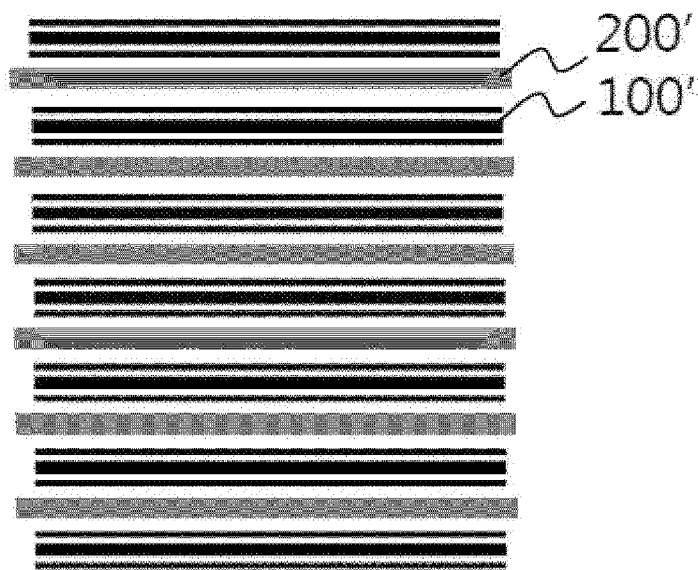
FIG. 6 is a schematic view showing a plurality of stacked electrodes in an electrode drying method according to another embodiment of the present invention.

Meanwhile, FIG. 6 is a schematic view showing a plurality of stacked electrodes in an electrode drying method according to another embodiment of the present invention. In this embodiment, a plurality of electrodes is stacked in order to dry the electrodes, instead of winding an electrode sheet in the form of a roll.

Referring to FIG. 6, a plurality of electrodes 100' is stacked, and hygroscopic films 200' are interposed respectively between the electrodes 100'. In the case in which the electrodes 100' are dried in the state in which the hygroscopic films 200' are interposed respectively between the electrodes 100', it is also possible to sufficiently dry each of the electrodes that are located in the middle of the electrode stack.

Each of the hygroscopic films 200' may have the structure described above. For example, each of the hygroscopic films 200' may have any of the structures shown in FIGS. 2 to 5.

Example 1

Artificial graphite, as a negative electrode active material, Denka Black, as a conductive agent, and styrene butadiene rubber (SBR), as an aqueous binder, were mixed with water while having a weight ratio of 96:2:2 to prepare slurry.

The slurry was coated on opposite surfaces of a copper (Cu) foil having a thickness of 6 μm to manufacture a temporary electrode, and the temporary electrode was wound with polyvinyl alcohol (PVA) having a thickness of 20 μm, as a hygroscopic film, as shown in FIG. 1. At this time, the hygroscopic film had the surface structure shown in FIG. 2.

Example 2

A coating solution obtained by dispersing silica gel in acetone was coated on opposite surfaces of polyvinyl alcohol (PVA) having a thickness of 20 μm, as a hygroscopic film (which had a structure shown in FIG. 2), such that the coating solution had a thickness of 5 μm and was dried to manufacture a hygroscopic film coated with silica gel.

The hygroscopic film was wound with the temporary electrode manufactured in Example 1, as shown in FIG. 1.

Comparative Example 1

Only the temporary electrode manufactured in Example 1 was wound.

Comparative Example 2

A hygroscopic film (PVA) having a thickness of 20 μm and an even surface structure (i.e. a smooth structure) was wound with the temporary electrode manufactured in Example 1.

Experimental Example 1

The electrodes manufactured in Examples 1 and 2 and Comparative Examples 1 and 2 were placed in a drying chamber, and were dried at a temperature of 100° C. for five hours. The portion of the electrode located at the innermost side of each of the wound electrodes was punched so as to have an area of 1.4875 cm$^2$ (the area of a positive electrode coin cell), and the moisture content of the punched portion of the electrode was measured. The results are shown in Table 1 below.

TABLE 1

|  | Example 1 | Example 2 | Comparative Example 1 | Comparative Example 2 |
|---|---|---|---|---|
| Moisture content (ppm) | 214 | 238 | 408 | 342 |

It can be seen from Table 1 that it is possible to easily dry the inside portion of each of the electrodes according to the present invention. Particularly, in the case in which a hygroscopic film having an uneven structure is used, as in the present invention, it can be definitely seen that it is possible to more easily dry the portion of the electrode located at the core side of the wound electrode than in the case in which a hygroscopic film having an even structure is used (as in Comparative Example 2).

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode drying method according to the present invention is performed in the state in which a hygroscopic film having an uneven structure is interposed between stacked electrodes or in the state in which an electrode sheet is wound with a hygroscopic film having an uneven structure. As a result, air in a drying chamber is brought into contact with each of the electrodes that are located in the middle of the electrode stack or the portion of the electrode sheet that is located at the core side of the wound electrode sheet, and each of the electrodes that are located in the middle of the electrode stack or the portion of the electrode sheet that is located at the core side of the wound electrode sheet can be more easily dried by the provision of the hygroscopic film. Consequently, it is possible to shorten the drying time. In addition, since each of the electrodes that are located in the middle of the electrode stack or the portion of the electrode sheet that is located at the core side of the wound electrode sheet is sufficiently dried, a difference between the moisture content of the electrodes that are located in the middle of the electrode stack and the moisture content of the electrodes that are located at the outer side of the electrode stack, or a difference between the moisture content of the portion of the electrode sheet that is located at the core side of the wound electrode sheet and the moisture content of the portion of the electrode sheet that is located at the outer side of the wound electrode sheet, is reduced. In the case in which batteries are manufactured using the electrodes or the electrode sheet dried as described above, therefore, it is possible to prevent a reduction in the performance of the batteries due to the moisture remaining in the electrodes or the electrode sheet.

The invention claimed is:

1. An electrode drying method for drying a plurality of electrodes in a state in which the plurality of electrodes is stacked, the electrode drying method comprising:
    interposing a hygroscopic film between adjacent ones of the plurality of electrodes to form a stack, in which the hygroscopic film is interposed between the adjacent ones of the plurality of electrodes; and
    drying the stack in a drying furnace
    wherein at least one surface of the hygroscopic film that faces one of the adjacent ones of the plurality of electrodes has an uneven structure defining airflow channels extending across the hygroscopic film from a first side to an opposing second side in a width dimension of the hygroscopic film, the uneven structure being any one selected from a group consisting of: a structure formed in the shape of waves having a round tile structure having curved valleys and curved ridges, and a structure formed in the shape of waves having a polygonal tile structure having polygonal valleys and polygonal ridges,
    wherein, during the drying step, air within the drying furnace flows through the airflow channels between the adjacent ones of the plurality of electrodes to dry the electrodes.

2. The electrode drying method according to claim 1, wherein an opposing surface of the hygroscopic film has a second uneven structure on an opposite side of the hygroscopic film from the at least one surface, wherein the second uneven structure is complementary to the uneven structure of the at least one surface.

3. The electrode drying method according to claim 1, wherein the hygroscopic film is a film made of ester fiber, cellulose fiber, or alcohol fiber.

4. The electrode drying method according to claim 3, wherein the alcohol fiber is made of a polyvinyl alcohol (PVA) resin.

5. The electrode drying method according to claim 1, wherein a thickness of the hygroscopic film is equal to or smaller than a thickness of each of the plurality of electrodes.

6. The electrode drying method according to claim 1, wherein an adsorptive material that is capable of adsorbing moisture ($H_2O$) is coated on the at least one surface of the hygroscopic film.

7. An electrode drying method for drying an electrode sheet in a state in which the electrode sheet is wound, the electrode drying method comprising:
    winding the electrode sheet with a hygroscopic film into a wound roll, in which the hygroscopic film is interposed between adjacent layers of the wound electrode sheet; and
    drying the wound roll in a drying furnace
    wherein at least one surface of the hygroscopic film that is disposed opposite the electrode sheet has an uneven structure defining airflow channels extending across the hygroscopic film from a first side to an opposing second side in a width dimension of the hygroscopic film, the uneven structure being any one selected from a group consisting of: a structure formed in the shape of waves having a round tile structure having curved valleys and curved ridges, and a structure formed in the shape of waves having a polygonal tile structure having polygonal valleys and polygonal ridges,
    wherein, during the drying step, air within the drying furnace flows through the airflow channels between the adjacent layers of the wound electrode sheet to dry the electrode sheet.

8. The electrode drying method according to claim 7, wherein an opposing surface of the hygroscopic film has a second uneven structure on an opposite side of the hygroscopic film from the at least one surface, wherein the second uneven structure is complementary to the uneven structure of the at least one surface.

9. The electrode drying method according to claim 7, wherein the hygroscopic film is a film made of ester fiber, cellulose fiber, or alcohol fiber.

10. The electrode drying method according to claim 9, wherein the alcohol fiber is made of a polyvinyl alcohol (PVA) resin.

11. The electrode drying method according to claim 7, wherein a thickness of the hygroscopic film is equal to or smaller than a thickness of the electrode sheet.

12. The electrode drying method according to claim 7, wherein an adsorptive material that is capable of adsorbing moisture ($H_2O$) is coated on the at least one surface of the hygroscopic film.

* * * * *